United States Patent [19]
O'Brien et al.

[11] Patent Number: 6,072,022
[45] Date of Patent: Jun. 6, 2000

[54] PHYSIOLOGICAL FLUID SEPARATION VEHICLES HAVING IMPROVED RESISTANCE TO INWARD MIGRATION OF THERAPEUTIC AGENTS

[75] Inventors: William L. O'Brien; Dean A. Oester; Jeffrey A. Barnhorst, all of Cincinnati; Lidia Kupczyk-Subotkowska, West Chester; John P. Fisher, Cincinnati, all of Ohio

[73] Assignee: Henkel Corporation, Gulph Mills, Pa.

[21] Appl. No.: 09/433,164

[22] Filed: Nov. 3, 1999

[51] Int. Cl.[7] .............................. C08G 65/52; B01D 21/26
[52] U.S. Cl. ................. 528/295.3; 528/272; 528/300; 528/302; 528/308; 210/515; 210/518; 604/406
[58] Field of Search ................... 528/272, 295.3, 528/300, 302, 308; 210/515, 518; 604/406

[56] References Cited

U.S. PATENT DOCUMENTS

| | | | |
|---|---|---|---|
| 4,101,422 | 7/1978 | Lamont et al. | 210/84 |
| 4,148,764 | 4/1979 | Lamont et al. | 260/22 D |
| 5,124,434 | 6/1992 | O'Brien | 528/272 |

*Primary Examiner*—Samuel A. Acquah
*Attorney, Agent, or Firm*—John E. Drach; Steven J. Trzaska

[57] ABSTRACT

A polyester composition for use in facilitating separation of blood serum or plasma from a cellular portion of blood, the composition containing: (a) a multifunctional acid component comprising: (i) a benzene polycarboxylic acid, and derivatives thereof; and (ii) an aliphatic polycarboxylic acid having from about 16 to about 40 carbon atoms; and (b) a diol component, and wherein the multifunctional acid component and diol component are employed in an equivalent ratio ranging from about 0.8:1.1 to about 1.0:1.3.

37 Claims, No Drawings

PHYSIOLOGICAL FLUID SEPARATION VEHICLES HAVING IMPROVED RESISTANCE TO INWARD MIGRATION OF THERAPEUTIC AGENTS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to polyesters useful for facilitating the separation of blood serum or plasma from the cellular portion of blood. The polyesters of the invention are conveniently formulated into a partitioning composition for use in a blood collection vessel in which the blood sample is subjected to centrifugation until the cellular portion and serum or plasma are completely separated. The physical and chemical properties of the partitioning composition are such that a continuous, integral seal is provided between the separated blood phases, thereby maintaining separation of the phases after centrifugation and simplifying removal of the serum or plasma from the blood collection vessel. The high volume testing of blood components in hospitals and clinics has led to the development of various devices to simplify the collection of blood samples and preparation of the samples for analysis. Typically, whole blood is collected in an evacuated, elongated glass tube that is permanently closed at one end and sealed at the other end by a rubber stopper having a diaphragm which is penetrated by the double-tipped cannula used to draw the patient's blood. After the desired quantity of blood is collected, the collection vessel is subjected to centrifugation to yield two distinct phases comprising the cellular portion of the blood (heavy phase) and the blood serum or plasma (light phase). The light phase is typically removed from the collection vessel, e.g., via pipette or decantation, for testing.

It has been proposed heretofore to provide manufactured, seal-forming members, e.g., resilient pistons, spools, discs and the like, in blood collection vessels to serve as mechanical barriers between the two separated phases. Because of the high cost of manufacturing such devices to the close tolerances required to provide a functional seal, they have been supplanted by fluid sealant compositions. Fluid sealant compositions are formulated to have a specific gravity intermediate to the two blood phases sought to be separated, so as to provide a partition at the interface between the cellular and serum phases. Such compositions typically include a polymer base material, one or more additives for adjusting the specific gravity and viscosity of the resultant composition, and optionally, a network former.

Ideally, a commercially useful blood partitioning composition should maintain uniform physical and chemical properties for extended time periods prior to use, as well as during transportation and processing of blood samples, readily form a stable partition under normal centrifugation conditions and be relatively inert or unreactive toward the substance(s) in the blood whose presence or concentration is to be determined.

Inertness to substances sought to be determined is a particular concern when blood collection vessels are used for therapeutic drug monitoring (TDM), which is assuming an increasingly important role in drug treatment strategies. TDM enables the administration of drugs in the appropriate therapeutic ranges, established through the accumulated experience of clinicians, and consequently reduces the number of patients receiving dosage levels that are either below detection limits or toxic. Administration of drugs under TDM allows one to take into account such factors as drug tolerance developed with passage of time, presence of multiple physical disorders and synergistic or antagonistic interactions with other therapeutic agents. Among the drugs recommended for administration under TDM are those having dangerous toxicity with poorly defined clinical endpoint, steep dose-response curve, narrow therapeutic range, considerable inter-individual pharmacokinetic variability or non-linear pharmacokinetics, as well as those used in long term therapy or in the treatment of life-threatening diseases. By way of example, the evaluation of blood levels of a number of tricyclic antidepressant compounds, such as imipramine or desipramine, in relation to an empirically established therapeutic range is reported to be particularly useful in the treatment of seemingly drug-refractory depression. TDM is likewise used to monitor the dosage of anticonvulsant drugs, such as phenytoin and phenobarbital which are administered in the treatment of epilepsy, antitumor drugs, such as methotrexate, and other more commonly prescribed drugs, including, but not limited to digoxin, lidocaine, pentobarbital and theophylline.

Reports of recent studies on the effect of blood partitioning compositions on drug concentrations in serum and plasma indicate that care must be taken in the selection of polymeric materials which come into contact with the blood samples obtained for drug assay. The results of these studies show that the blood partitioning compositions provided in blood collection vessels may account for reduced serum or plasma values, as a result of drug absorption by one or more components of the composition. The reported decreases in measured drug concentrations appear to be time-dependent. One report concludes that the observed decreases in drug concentrations may effectively be reduced by minimizing the interval between collection and processing. Another report recommends that blood samples be transported to the laboratory as soon as possible, with processing occurring within 4 hours. A commercially useful blood collection vessel, however, must produce accurate test results, taking into account routine clinical practices in large institutions, where collection, transportation and processing of blood samples which may extend over a period of up to 72 hours.

BRIEF SUMMARY OF THE INVENTION

The present invention is directed to a polyester composition for use in facilitating the separation of blood serum or plasma from a cellular portion of blood, the composition comprising:
(a) a multifunctional acid component comprising:
  (i) a benzene polycarboxylic acid component, including isomers and substitution products thereof; and
  (ii) an aliphatic polycarboxylic having from about 16 to about 40 carbon atoms; and
(b) a diol component, and wherein the acid component and diol component are present in the composition in an equivalent ratio ranging from about 0.8:1.1 to about 1.0:1.35.

The present invention is also directed to a polyester composition, as disclosed above, which is subsequently acetylated to a residual hydroxyl value of up to about 8.0.

The present invention is also directed to a process for making a polyester composition for use in facilitating the separation of blood serum or plasma from the cellular portion of blood, the process comprising:

(a) providing a multifunctional acid component comprising:
   (i) a benzene polycarboxylic acid component, including isomers and substitution products thereof; and
   (ii) an aliphatic polycarboxylic having from about 16 to about 40 carbon atoms;
(b) providing a diol component; and
(c) reacting the acid component and diol component to form the polyester composition, with the proviso that the acid component and diol component are reacted at an equivalent ratio ranging from about 0.8:1.1 to about 1.0:1.35.

The present invention is also directed to a process for making a polyester composition as disclosed above having a residual hydroxyl value of up to about 8.0 by employing an acetylation step at the end of the above-disclosed process.

BRIEF DESCRIPTION OF THE SEVERAL VIEWS OF THE DRAWING

NOT APPLICABLE.

DETAILED DESCRIPTION OF THE INVENTION

Other than in the operating examples, or where otherwise indicated, all numbers expressing quantities of ingredients and reaction conditions are to be understood as being modified in all instances by the term "about".

The polyesters according to the invention have molecular weights ranging from about 3,000 to about 12,000 (number average, as determined by gel permeation chromatography). The polyesters of the invention are produced in the form of viscous liquids, having a density, at room temperature, in the range of from about 1.01 to about 1.09. The density of the component of mammalian blood which is rich in cellular material is about 1.07–1.08, imposing a working limit of $\leq 1.07$ for the completely formulated separator plug/barrier when used to separate serum from erythrocyte-leukocyte mixtures. It should be noted, however, that higher densities may be useful for further separation of the heavy components. Particularly notable among the properties of these polyesters is their inertness, making them especially useful in TDM programs. The polyesters of the invention are also highly hydrophobic, exhibiting negligible water solubility. The physical and chemical properties of these polyesters are uniformly maintained over extended periods prior to use, as well as during transportation and processing of blood samples. Among the other notable characteristics of these polyesters is their ability to undergo ultracentrifugation for up to 1 hour, at up to 1500 g (G being the ratio of centrifugal acceleration to acceleration of gravity), without any detectable adverse effect.

The polyesters of the invention are further characterized by having an acid value of up to about 8.0, an hydroxyl value of up to about 8, and a kinematic viscosity at 99° C., of from about 1700–4000 centistokes.

Polyesters having the above-described properties are especially useful as blood partitioning agents in blood collection vessels where they provide a continuous integral barrier or seal between the serum and clot portions of blood. In other words, the polyester completely partitions the separated phases so that the serum and cellular or clot portions are no longer in contact at any point, forming a unitary seal which firmly adheres to the inner surface of the blood collection vessel. By forming a continuous, integral barrier in this way, it is possible to easily remove the serum or plasma portion by decanting or pipetting, with the clot portion remaining undisturbed in the collection vessel.

The multifunctional acid member of the polyesters of the invention is comprised of two polycarboxylic acids, the first of which includes a benzene polycarboxylic acid. Examples of suitable benzene polycarboxylic acids include, but are not limited to, phthalic acid and its isomers such as phthalic anhydride, isophthalic acid, and tertiary butyl isophthalic acid, naphthalic acid and isomers thereof, benzene tricarboxylic acids such as trimellitic anhydride, and mixtures thereof.

The second group of polycarboxylic acids includes polymeric acids, i.e., aliphatic di-, and tricarboxylic acids having from about 16–40 carbon atoms obtained by the polymerization of olefinically unsaturated monocarboxylic acids having from 16–20 carbon atoms, such as palmitoleic acid, oleic acid, linoleic acid, linolenic acid and the like. Particularly preferred polymeric acids for use in the present invention will have as their principal component a C-36 dimer acid. Such C-36 dicarboxylic acids are obtained by the dimerization of two moles of a C-18 unsaturated monocarboxylic acid, such as oleic acid or linoleic acid, or mixtures thereof, e.g., tall oil fatty acids. These products typically contain 75% by weight or more of C-36 dimer acid and have an acid value in the range of 180–215, saponification value in the range of 190–215 and neutral equivalent from 265–310. The dimer acids may be hydrogenated prior to use. To increase the C-36 dimer content and reduce the amount of by-product acids, including unreacted monobasic acid, trimer and higher polymer acids, the polymeric fatty acid may be molecularly distilled or otherwise fractionated.

The first group of polycarboxylic acids, preferably benzene dicarboxylic acid, is employed in an amount of from about 0.51 to about 0.85 equivalents, preferably from about 0.56 to about 0.79 equivalents, and most preferably from about 0.62 to about 0.73 equivalents, based on the total number of equivalents of the multifunctional acid component of the polyester. The second polycarboxylic acid, preferably a dimer acid, is employed in an amount of from about 0.56 to about 0.17 equivalents, preferably from about 0.49 to about 0.24 equivalents, and most preferably from about 0.43 to about 0.30 equivalents, based on the total number of equivalents of the multifunctional acid component of the polyester. Thus, the total number of equivalents for the multifunctional acid component will range from about 0.8 to about 1.0 equivalents, preferably from about 0.85 to about 1.0 equivalents, and most preferably about 0.875 to about 1.0 equivalents.

Suitable diols which may be reacted with the above-described multifunctional acid component to yield the polyesters of the invention include diols of the formula:

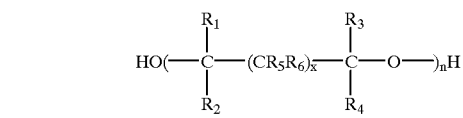

in which $R_1$, $R_2$, $R_3$ and $R_4$ are independently selected from the group consisting of hydrogen and an alkyl group having 1–4 carbon atoms, n=1–4 and x=0–4. Representative diols falling within the foregoing formula include neopentyl glycol, propylene glycol, diethylene glycol, triethylene glycol, 3-methyl-1,5-pentane diol, 1,2 propane diol, 1,3-butane diol, 1,2-butane diol, 1,2-pentane diol, 1,3-pentane diol, 1,4-pentane diol and the like. The preferred diols contain from 3–5 carbon atoms, with particularly useful polyesters products being obtained using neopentyl glycol, propylene glycol, triethylene glycol, or mixtures thereof. The amount of diol component to be reacted with one equivalent of the above-described acid component will range from about 1.0 to about 1.35 equivalents, preferably from about 1.0 to about 1.25 equivalents, and most preferably about 1.2 equivalents.

Consequently, the multifunctional acid and diol components are reacted at an equivalent ratio of acid:diol ranging from about 0.8:1.1 to about 1.0:1.35, preferably from about 1.0:1.3 to about 1.0:1.15, and most preferably about 1.0:1.2, wherein all of these ratios are normalized to reflect the presence of 1.0 equivalent of carboxylic acid reactant(s).

Conventional esterification procedures and equipment are used to obtain the polyester of the invention. The reactive components are normally added to the reaction vessel as a unit charge and the reaction mixture is then heated with agitation at a temperature of from about 150–250° C. for a period of time sufficient to substantially complete the esterification reaction. The reaction may be driven to completion by application of vacuum (typically 1–5 mm Hg absolute at 200–250° C.) until the desired properties are obtained. Vacuum distillation removes the final traces of water, any excess reactants and small amounts of other volatile materials present in the reaction mixture.

If an improvement in color is desired, the polyester may be bleached by any of the well known and acceptable bleaching methods, e.g., using hydrogen peroxide or chlorite. Alternatively, the polyester may be decolorized by filtering through a filter aid, charcoal or bleaching clay.

The rate of esterification may be enhanced by the use of known esterification catalysts. Suitable esterification catalysts for enhancing the rate of esterification of free carboxyl groups include phosphoric acid, sulfuric acid, toluenesulfonic acid, methane sulfonic acid, and the like. The amount of such catalyst may vary widely, but most often will be in an amount from about 0.1% to about 0.5% by weight, based on the total reactant charge.

Catalysts useful for effecting ester interchange in order to increase the viscosity of the polyester include, but are not limited to, dibutyltin diacetate, stannous oxalate, dibutyltin oxide, tetrabutyl titanate, zinc acetate and the like. These catalysts are generally employed in an amount ranging from about 0.01% to 0.05% by weight, based on the total reactant charge. When such catalysts are used, it is not necessary that it be present throughout the entire reaction. It is sometimes advantageous in order to obtain products having good color and relatively low acid value, on the order of 2 mg KOH/gm, or less, to add the catalyst during the final stages of the reaction. Upon completion of the reaction, the catalyst may be deactivated and removed, if desired, by filtering or other conventional means.

Inert diluents, such as benzene, toluene, xylene and the like may be employed for the reaction, however, the use of diluents is not necessary. It is generally considered desirable to conduct the reaction without diluents since the resultant polyester can be directly used as it is obtained from the reaction vessel.

A particularly useful blood partitioning agent is obtained by reacting a total of about 0.67 equivalents of multifunctional acid member comprised of: (i) about 0.335 equivalents of phthalic anhydride and about 0.335 equivalents of isophthalic acid and, (ii) about 0.33 equivalents of oleic dimer acid as the second acid component with about 1.2 equivalents of diol member comprising neopentyl glycol and 1,2-propylene glycol. The equivalents ratio of neopentyl glycol to propylene glycol ranges from about 0.85:0.35 to about 1.05:0.15.

According to another embodiment of the present invention, it has been surprisingly found that by acetylating a polyester of the present invention, it is possible to further enhance the TDM properties. By lowering the residual hydroxyl value of the above-described polyesters, the therapeutic drugs being tested for are even less likely to be absorbed into the polyester barrier over time. Consequently, an even more accurate TDM system is obtained. Thus, according to this aspect of the invention, the above-disclosed polyesters are acetylated to a residual hydroxyl value of up to about 8.0, preferably from about 1.0 to about 5.0, and most preferably about 3.0. The acetylation step may be carried out using any known acetylation compound such as, for example, acetic anhydride.

The source of the acids or acid derivatives and the manner by which the multifunctional acid blends are prepared, in those embodiments where such blends are used, is of no consequence so long as the resulting blend contains the specified acids or acid derivatives in the required ratios. Thus, multifunctional acid or acid derivative blends may be obtained by mixing the individual acid components. On the other hand, mixtures of acid obtained as by-products from various manufacturing operations and which contain one or more of the necessary acid components may be advantageously utilized.

Preparation of blood partitioning compositions using the polyesters of the invention may be carried out in the manner described in commonly owned U.S. Pat. Nos. 4,101,422 and 4,148,764, the entire contents of which are incorporated by reference in the present specification, as if set forth herein in full.

Determination of the extent of interaction between the polyesters of the invention and commonly monitored drugs may be carried out using well known recovery experiments and drug measurement techniques, such as, gas chromatography, gas-liquid chromatography, high-performance liquid chromatography, thin layer chromatography or immunoassay techniques, including radioimmunoassay, enzyme immunoassay, fluorescence polarization immunoassay, nephelometric assay, and the like. A variety of suitable procedures are reported in the literature. Such determinations may be carried out using human serum, or commercially available bovine serum, if desired.

The present invention will be better understood from the examples which follow, all of which are intended for illustrative purposes only, and are not meant to unduly limit the scope of the invention in any way.

EXAMPLES

Example 1

A five liter reaction flask equipped with stirring, inert gas inlet, thermostat, and Vigreaux fractioning column set up for downward distillation was charged with 0.3 equivalent phthalic anhydride (442.5 g with scale factors applied), 0.3 equivalent isphthalic acid (497.5 g), 0.29 equivalent dimer acid (1650 g), 0.3 equivalent 1,2-propyleneglycol (227.5 g), and 0.9 equivalent neopentyl glycol (932.5 g). Heat was applied, the inert gas stream started, and water distilled from the refluxate. After 21 hours, the acid value was 3.3. The apparatus was evacuated to 200mm Hg for one hour, then to 4mm Hg for 17.5 hours. The product had a viscosity of 876 cSt/99° C., and a density ($\rho_{25}$) Of 1.0441.

Example 2

500 g of the product from Example 1 was then acetylated with 130 g acetic anhydride, yielding an acid value of 1.2, $\rho_{25}$ of 1.0455, and a hydroxyl value of 1.4.

Example 3

To the product of Example 2 there was then added 0.03% di-n-butylin diacetate, based on the net weight of product, followed by 40 minutes of reflux and 65 minutes of vacuum distillation at 14–2 mmHg yielded a product having a viscosity of 1930 cSt/99° C., $\rho_{25}$ of 1.0447.

Example 4

A subsequent acetylation of the product of Example 3 yielded a product having an Av of 1.2, a viscosity of 1424 cSt/99° C., and $\rho_{25}$ of 1.0464.

Example 5

The remainder of the original product from Example 1 was then vacuum-stripped at 220° C. to a final viscosity of 2895 cSt/99° C., $\rho_{25}$ of 1.0456. Acetylation of this product resulted in an Av of 1.96 and $\rho_{25}$ of 1.0466.

The polyesters prepared in examples 1–5 were then tested to determine the amount of imipramine, lidocaine and phenytoin that could be recovered under a conventional TDM program. The recovery test method used was that of Abbott Laboratories, TDx Assays Manual, document no. 45125-110 thru -114 (1993). The results are found in Table 1, below, and are based on a total control recovery of 100%.

TABLE 1

| Example | IMI (% recovery) | LIDO (% recovery) | PHEN (% recovery) |
|---|---|---|---|
| 1 | 32 | 52 | 70 |
| 2 | 36 | 66 | 78 |
| 3 | 37 | 43 | 84 |
| 4 | 15 | 50 | 80 |
| 5 | 38 | 47 | 91 |

What is claimed is:

1. A polyester composition for use in facilitating separation of blood serum or plasma from a cellular portion of blood, the composition comprising:
    (a) a multifunctional acid component comprising:
        (i) a benzene polycarboxylic acid, and derivatives thereof; and
        (ii) an aliphatic polycarboxylic acid having from about 16 to about 40 carbon atoms; and
    (b) a diol component, and wherein the multifunctional acid component and diol component are employed in an equivalent ratio ranging from about 0.8:1.1 to about 1.0:1.35.

2. The composition of claim 1 wherein the benzene polycarboxylic acid is employed in an amount of from about 0.51 to about 0.85 equivalents.

3. The composition of claim 1 wherein the benzene polycarboxylic acid is selected from the group consisting of phthalic acid anhydride, isophthalic acid, and mixtures thereof.

4. The composition of claim 1 wherein the aliphatic polycarboxylic acid is employed in an amount of from about 0.17 to about 0.56 equivalents.

5. The composition of claim 1 wherein the aliphatic polycarboxylic acid is a $C_{36}$ dimer acid.

6. The composition of claim 1 wherein the diol component is employed in an amount of from about 1.0 to about 1.35 equivalents.

7. The composition of claim 1 wherein the diol component is selected from the group consisting of neopentyl glycol, propylene glycol, triethylene glycol and mixtures thereof.

8. The composition of claim 1 wherein the multifunctional acid component and diol component are employed in an equivalent ratio of about 1.0:1.2.

9. The composition of claim 1 wherein the polyester composition has a residual hydroxyl value of from about 15 to about 70.

10. The composition of claim 1 wherein the polyester composition has a residual hydroxyl value of up to about 5.

11. A polyester composition for use in facilitating separation of blood serum or plasma from a cellular portion of blood, the composition comprising:
    (a) a multifunctional acid component comprising:
        (i) about 0.3 equivalents of phthalic anhydride;
        (ii) about 0.3 equivalents of isophthalic acid; and
        (iii) about 0.3 equivalents of a $C_{36}$ dimer acid; and
    (b) a diol component comprising:
        (iv) about 0.9 equivalents of neopentyl glycol; and
        (v) about 0.3 equivalents of propylene glycol.

12. The composition of claim 11 wherein the polyester composition has a residual hydroxyl value of from about 15 to about 70.

13. The composition of claim 11 wherein the polyester composition has a residual hydroxyl value of up to about 5.

14. A process for making a polyester composition for use in facilitating separation of blood serum or plasma from a cellular portion of blood, the process comprising:
    (a) providing a multifunctional acid component comprising:
        (i) a benzene polycarboxylic acid, and derivatives thereof; and
        (ii) an aliphatic polycarboxylic acid having from about 16 to about 40 carbon atoms;
    (b) providing a diol component; and
    (c) reacting (a) and (b), in an equivalent ratio ranging from about 0.8:1.1 to about 1.0:1.35, to form the polyester composition.

15. The process of claim 14 wherein the benzene polycarboxylic acid is employed in an amount of from about 0.51 to about 0.85 equivalents.

16. The process of claim 14 wherein the benzene polycarboxylic acid is selected from the group consisting of phthalic acid anhydride, isophthalic acid, and mixtures thereof.

17. The process of claim 14 wherein the aliphatic polycarboxylic acid is employed in an amount of from about 0.15 to about 0.49 equivalents.

18. The process of claim 14 wherein the aliphatic polycarboxylic acid is a $C_{36}$ dimer acid.

19. The process of claim 14 wherein the diol component is employed in an amount of from about 1.1 to about 1.35 equivalents.

20. The process of claim 14 wherein the diol component is selected from the group consisting of neopentyl glycol, propylene glycol, triethylene glycol and mixtures thereof.

21. The process of claim 14 wherein the multifunctional acid component and diol component are employed in an equivalent ratio of about 1.0:1.2.

22. The process of claim 14 wherein the polyester composition has a residual hydroxyl value of from about 15 to about 70.

23. The process of claim 14 further comprising acetylating the polyester composition to a residual hydroxyl value of up to about 5.

24. A process for making a polyester composition for use in facilitating the separation of blood serum or plasma from a cellular portion of blood, the process comprising:
   (a) providing a multifunctional acid component comprising:
      (i) about 0.3 equivalents of phthalic anhydride;
      (ii) about 0.3 equivalents of isophthalic acid; and
      (iii) about 0.3 equivalents of a $C_{36}$ dimer acid;
   (b) providing a diol component comprising:
      (iv) about 0.9 equivalents of neopentyl glycol; and
      (v) about 0.3 equivalents of propylene glycol; and
   (c) reacting (a) and (b) to form a polyester composition having a residual hydroxyl value of from about 15 to about 70.

25. The process of claim 24 further comprising acetylating the polyester composition to a residual hydroxyl value of up to about 5.

26. The product of the process of claim 14.
27. The product of the process of claim 15.
28. The product of the process of claim 16.
29. The product of the process of claim 17.
30. The product of the process of claim 18.
31. The product of the process of claim 19.
32. The product of the process of claim 20.
33. The product of the process of claim 21.
34. The product of the process of claim 22.
35. The product of the process of claim 23.
36. The product of the process of claim 24.
37. The product of the process of claim 25.

* * * * *